United States Patent [19]

Kim

[11] Patent Number: 5,389,967
[45] Date of Patent: Feb. 14, 1995

[54] OBJECT TRACKING APPARATUS AND METHOD OF CAMCORDER

[75] Inventor: Ki-Yong Kim, Kyonggi-do, Rep. of Korea

[73] Assignee: SamSung Electronics Co., Ltd., Suwon, Rep. of Korea

[21] Appl. No.: 942,402

[22] Filed: Sep. 9, 1992

[30] Foreign Application Priority Data

Sep. 13, 1991 [KR] Rep. of Korea ............... 91-15969

[51] Int. Cl.⁶ .................................................. H04N 5/232
[52] U.S. Cl. .................................... 348/169; 348/211; 348/373
[58] Field of Search ............... 358/125, 210, 229; H04N 7/18, 5/232; 348/169, 211, 373

[56] References Cited

U.S. PATENT DOCUMENTS

| | | | |
|---|---|---|---|
| 3,419,674 | 12/1968 | Burns et al. | 358/125 |
| 3,711,638 | 1/1973 | Davies | 358/210 |
| 5,091,781 | 2/1992 | An | 358/125 |
| 5,179,421 | 1/1993 | Parker | 358/125 |
| 5,196,688 | 3/1993 | Hesse | 358/125 |
| 5,223,875 | 6/1993 | Yanagisawa | 358/125 |

FOREIGN PATENT DOCUMENTS

| | | |
|---|---|---|
| 2272554 | 12/1975 | France . |
| 60-254107 | 12/1985 | Japan . |
| 63-191133(A) | 8/1988 | Japan . |

*Primary Examiner*—Howard W. Britton
*Attorney, Agent, or Firm*—Robert E. Bushnell

[57] ABSTRACT

An object tracking apparatus and method of a camcorder which can detect the travelling object and can automatically track the object for shooting by utilizing infra-red incident upon light receiving element from the object.

Two embodiments of the object tracking apparatus and method thereof can detect the moving direction of an object so that the shooting direction of a camcorder can be caused to change by comparing mutually the changing electrical signals as the output of a photoelectric converter which converts the light incident from the object to electrical signals changes according to the movement of an object.

19 Claims, 7 Drawing Sheets

OBJECT TRACKING APPARATUS AND METHOD OF CAMCORDER

BACKGROUND OF THE INVENTION

1. Field of the Invention

The present invention relates to a camcorder, and more particularly to an object tracking apparatus and method of a camcorder, which uses infra-red for auto-focusing, wherein the movement of objects is detected by using infra-red incident upon light receiving member from objects and thus moving objects can be automatically tracked and photographed.

2. Description of Prior Art

Recent development of sophisticated technologies has set a tendency of making a camcorder light-weighted, miniaturized and automated.

Specifically conspicuous is the rapidly-progressing development of object tracking function which can automatically track and photograph objects and of auto-focusing function which can perform the focus automatically, which is accelerated by the need that the development of auto-focusing function and object tracking function can be effectively utilized by camcorder, because, in the days when the popularization of camcorders is on the increase, the user himself absolutely needs said technologies when he wishes to photograph.

Accordingly, in Japanese laid open patent application No. Sho 62(1987)-208783 entitled, "Automatic Tracking Video Camera", a technique is disclosed wherein the infra-red received from objects is photo-electrically (converted) central position of objects is detected from the photo-electrically (converted) electrical signal and camera direction is controlled as opposed to the central position of detected objects.

However, said Japanese laid open patent application No. Sho 62-208783 has a disadvantage of complicating the apparatus by detecting the central position of the objects after infra-red is received from the objects and converted to electrical signals, which is not proper to suit the current trend of giving importance to miniaturizing the camcorder because voluminous size of equipment causes one of the reason to increase the price of a camcorder.

Furthermore, separate apparatuses are needed to equip auto-focusing function, thus causing inevitable increase of unit price and bulkiness of the apparatus.

In other words, separate auto-focusing apparatus is needed, as depicted in FIG. 1 and FIG. 2, in order to equip auto-focusing and object tracking function.

According to FIG. 1, auto-focusing apparatus 100 is mounted under the lens 10 of a camcorder and on the front of the main body 20.

Said auto-focusing apparatus 100 comprises a light emitter 1, a light receiver 2 for receiving incident infra-red reflected upon objects after emitted from said light emitter 1, and a controller (not shown) wherein a distance between a camcorder and an object is calculated by the time difference between the time infra-red is emitted from said light emitter i and the time infra-red is received from light receiver 2, and then lens 10 is driven by the calculated value for performing focusing.

In this location, a light receiver 2 comprises a light receiving lens 3 for collecting incident infra-red and a photoelectric conversion element of a photo sensor (such as photo diode) 4 for converting the light collected from said light receiving lens 3 to electrical signal.

In FIG. 2 a photo sensor 4 of said photo electric conversion element is enlarged for illustration.

In other words, the infra-red collected at light receiving lens 3 of light receiver 2 is detected by two photo sensors 4 as depicted in FIG. 2, converted to electrical signal and is outputted to a controller (not shown), which, by utilizing the infra-red received by said photo sensor 4, calculates the distance between a camera and an object for performing the focusing.

Accordingly, in order to equip auto-focusing function and automatic object tracking function for a camcorder, an auto-focusing apparatus and an automatic object tracking apparatus have been conventionally needed, thereby causing the problem of making a camcorder bulky, which is a reverse trend of miniaturizing and lightening the camcorder.

SUMMARY OF THE INVENTION

Subsequently, it is one object of the present invention to track and shoot objects automatically by way of simple construction.

Furthermore, it is another object of the present invention to lighten and miniaturize a camcorder by providing an object tracking apparatus utilizing an auto-focus apparatus.

In accordance with one aspect of the present invention, there is provided an object tracking apparatus of a camcorder, comprising:

photoelectric conversion means for converting to electrical signals the incident and focusing-purpose infra-red generated from a light emitter and reflected on objects and the incident light generated from a light emitter attached to objects;

travelling object detection means for discriminating the object movement by utilizing the signals photoelectric-converted from said photoelectric conversion means; and direction switching means for converting the shooting direction of a camcorder according to the travelling object detected from said travelling object detection means.

Furthermore, in accordance with another aspect of the present invention, there is provided an object tracking method of a camcorder, comprising:

a first step for comparing the magnitudes of electrical signals outputted respectively from at least more than 4 photoelectric conversion means wherein the light incident from objects is converted to electrical signals; and a second step for converting the direction of a camcorder according to the comparison results from said first step.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
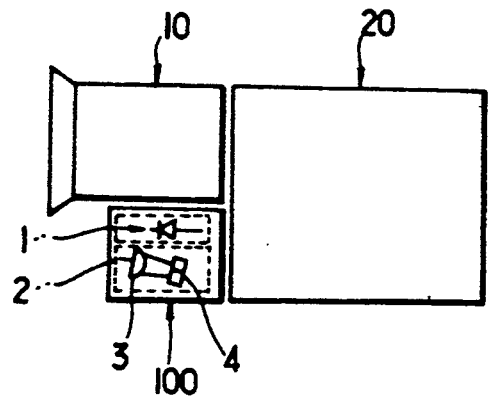
FIG. 1 is a schematic side-view drawing of conventional auto-focusing apparatus.
Figure 2:
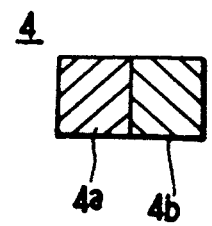
FIG. 2 a constructional drawing of a light receiver as depicted in FIG. 1.
Figure 3:
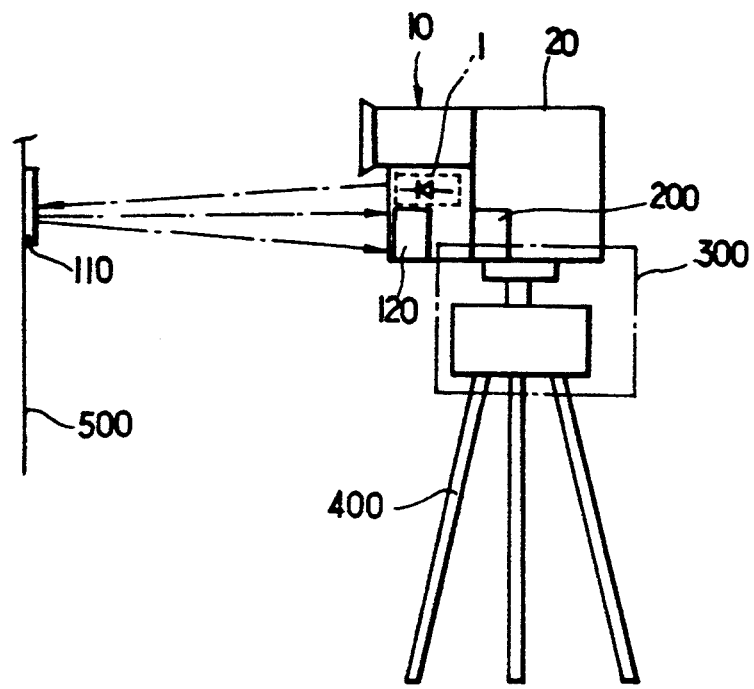
FIG. 3 is a schematic side-view drawing of a camcorder equipped with an object tracking apparatus in accordance with the present invention.

FIG. 3 is a schematic side-view drawing of a camcorder equipped with an object tracking apparatus in accordance with the present invention.

According to FIG. 3, the object tracking apparatus in accordance with the present invention includes:

photoelectric conversion means 120 for converting to electrical signals the incident, focusing-purpose infra-red generated from focusing-purpose light emitter 1 and the incident light generated from light emitting means 110 for object detection attached to an object 500;

travelling object detection means 200 for detecting the travelling status of an object by utilizing signals photoelectrically-coverted from said photoelectric conversion means 120; and direction switching means 300 for switching the shooting direction of a camcorder supported by a tripod 400 in accordance with the travelling object detected by said travelling object detection means.

In this location, focusing-purpose light emitter 1 is conventionally attached to a camcorder.

Light emitting means 110 for object detection, in order to prevent interference with the auto focusing-purpose infra-red emitted from said focusing-purpose light emitter 1, generates the lights having different frequencies, and is attached to an object 500 or a remocon(not shown) for controlling the camcorder in the distance.

Meanwhile, photoelectric conversion means 120 is composed of at least more than 4 photo sensors 122, 124, 126, 128, and among these photo sensors, 2 photo sensors are used for dual purpose of auto-focusing.

Figure 4:
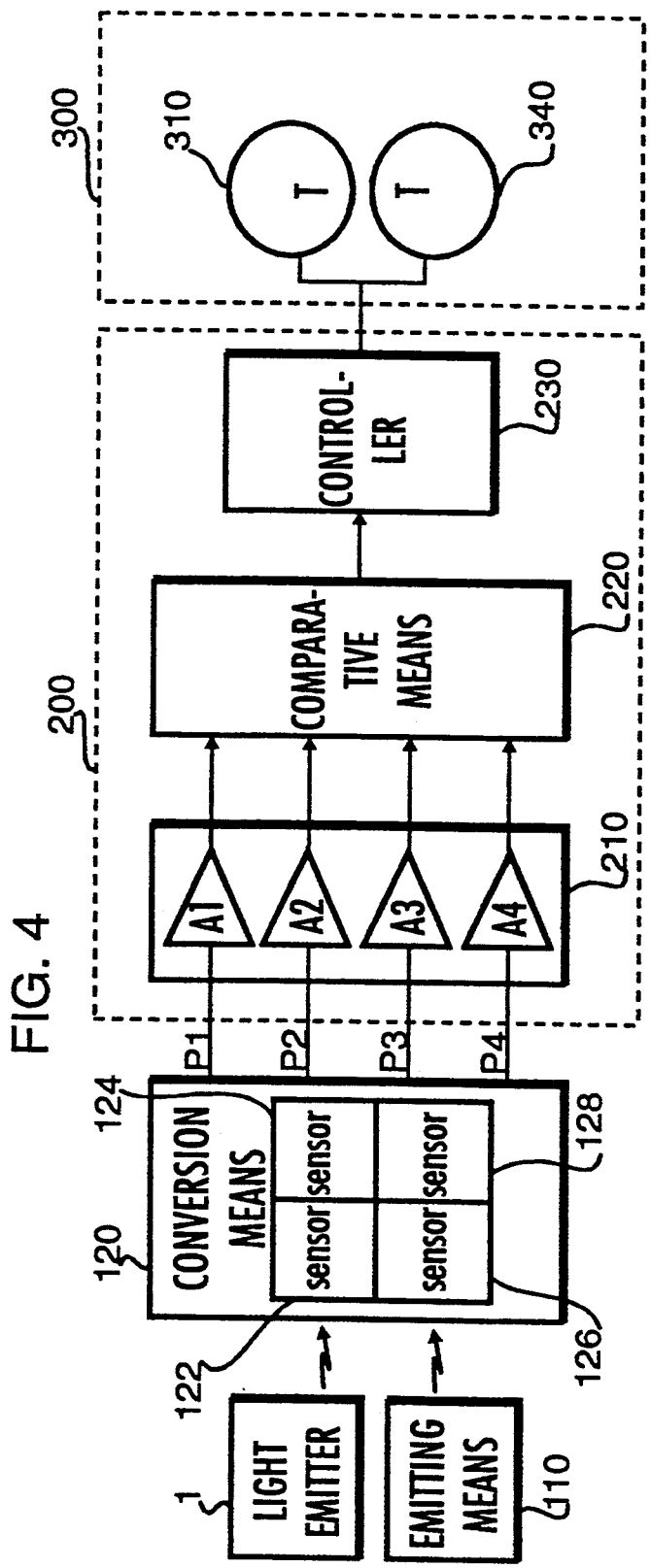
FIG. 4 is a block diagram of an object tracking apparatus in accordance with the present invention.

FIG. 4 is a overall block diagram of an object tracking apparatus in accordance with the present invention.

According to FIG. 4, the object tracking apparatus of a camcorder in accordance with the present invention comprises:

photoelectric conversion means 120 for converting to electrical signals the incident, focus-purpose infrared generated from focusing-purpose light emitter 1 and reflected upon objects and the incident light generated from light emitting means 110 for object detection attached to the object;

travelling object detection means 200 for detecting the travelling object by utilizing the signals photoelectrically converted from said photoelectric conversion means;

direction switching means 300 for switching the shooting direction of a camcorder in accordance with travelling objects detected by said travelling object detection means 200.

With reference to FIG. 3 and FIG. 4, more detailed explanation is given as below.

First of all, focusing-purpose light emitter 1 is usually attached to a camcorder.

The light(infra-red) emitted from said focusing-purpose light emitter 1 is reflected on an object 500 and is incident upon photo sensors 126, 128 of photoelectric conversion means 120 attached to the camcorder.

Said photo sensors 126, 128 convert the incident light to electrical signals and output to a controller (not shown), which, utilizing the light-emitted time and the time infra-red is received at photo sensors 126, 128, performs focusing by calculating the distance between a camcorder and an object.

In the meantime, light emitting means 110 for object detection, in order to prevent the interference with auto focusing-purpose infra-red emitted from said focusing-purpose light emitter 1, generates lights having different frequencies, and is attached to an object or a remocon(not shown) for controlling the camcorder in the distance.

When the lights are generated from said light emitting means 110 for object detection and are incident on photoelectric conversion means 120, photoelectric conversion means 120 converts the lights to electrical signals.

At this point, photoelectric conversion means 120 comprises at least more than 4 photo sensors 122, 124, 126, 128 and the lights incident on the respective photo sensors 122, 124, 126, 128 become different according to the movement of objects.

Accordingly, the electrical signals respectively outputed from photo sensors 122, 124, 126, 128 also become different according to the movement of an object 500.

In other words, if the object 500 is transferred to the right, based on the center of photoelectric conversion means 120 as reference, the lights incident on photoelectric conversion means 120 become incident being tilted toward photo sensors 122, 126 mounted on the left in proportion to displaced magnitudes of the object 500.

If the object 500 swerves to the left from the center of photoelectric conversion means 120 as reference, the lights incident on photoelectric conversion means 120 become incident being tilted toward the photo sensors 124, 128 mounted in the right in proportion to the displaced magnitudes of the object 500.

Consequently, the magnitudes of electrical signals P1, P2, P3, P4 outputted from photo sensors 122, 124, 126, 128 of photoelectric conversion means 120 become different.

Meanwhile, travelling object detection means 200 comprises an amplifier 210 for amplifying the electrical signals P1, P2, P3, P4 photoelectrically converted from said photoelectric conversion means 120, a comparator 210 for comparing mutually the signals amplified from said amplifier 210, and a controller 230 for outputting the shooting direction converting signal by discriminating the travelling direction and travelling amount of an object in accordance with the comparison results of said comparator 220.

Travelling object detection means 200, as constructed in the above, outputs control signal in accordance with travelling status of an object by utilizing the electrical signals P1, P2, P3, P4 of photoelectric conversion means 120 outputted differently according to the transfer of the object.

In other words, at the amplifier 210 of travelling object detection means 200, the electrical signals P1, P2, P3, P4 outputted from photoelectric conversion means 120 are amplified for outputting, and comparative circuit 220 converts amplified signals P1, P2, P3, P4 to digital signals for mutual comparison and discriminates which direction the object has travelled from the shooting center.

In accordance with the judgement of said comparative circuit 220, the controller 230 outputs control signal in order to correct the displaced shooting center.

Direction switching means 300, in accordance with shooting direction switching signals outputted from said travelling object detection means 200, comprises a up/down traveller 310 for moving the shooting direction of a camcorder up and down, and a left/right traveller 340 for moving the shooting direction of a camcorder in the left and right direction.

Direction switching means 300 comprising up/down traveller 310 and left/right traveller 340 as explained in the above, in accordance with control signals outputted from travelling object detection means 200, switches the shooting directions of a camcorder for the object to be positioned in the center of shooting direction.

Namely, direction switching means 300 is mounted between supportive means of a tripod 400 and main body 20 of a camcorder, and rotates the camcorder in all directions so that the direction of lens 10 should always direct toward the object 500.

In this way, the object tracking apparatus of a camcorder in accordance with the present invention changes the shooting directions along the movements of objects so that the object should not get out of the shooting ranges for accurate shooting.

Figure 5:
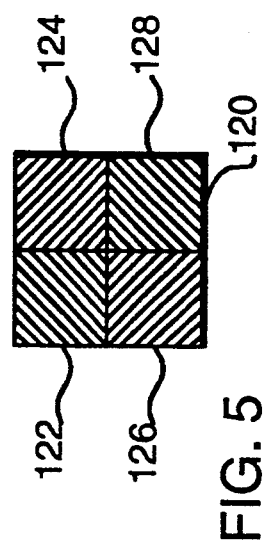
FIG. 5 is a constructional drawing of a light receiver as depicted in FIG. 3.

FIG. 5 is a constructional drawing of said photoelectric conversion means 120, which comprises 4 photo sensors 122, 124, 126, 128 in order to monitor the movements of objects irrespective of directions.

Said photo sensors 122, 124, 126, 128 are mounted on upper left, upper right, lower left and lower right respectively, and according to incident light quantity, output the electrical signals P1, P2, P3, P4 of different magnitudes.

Figure 6:
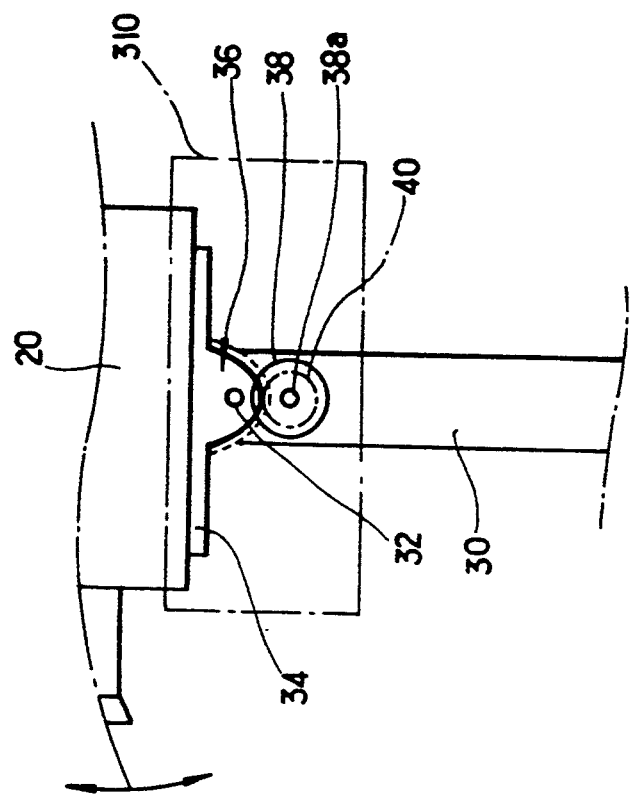
FIG. 6 is a constructional drawing of one embodiment of up/down moving means in accordance with the present invention.

FIG. 6 is a constructional drawing of one embodiment of said up/down traveller 310.

According to FIG. 6, the up/down traveller 310 comprises a motor 38 for rotating in the right and reverse directions according to the control signal outputted from the controller 230 of travelling object detection means 200, a gear 40 for rotating in the right and left, being fixed to a shaft 38a of said motor 38, a semicircle gear 36 for rotating around a hinge 32 mounted on the upper side of a supporting shaft 30, being engaged with said gear 40, and a supporting plate 34 for being fixed to the lower area of the main body of a camcorder 20, being formed integrally with said semicircle gear 36.

Accordingly, in FIG. 3 or FIG. 4, when travelling object detection means 200 discriminates that the object has deviated to the upper side of shooting direction, causing to output control signals, then the motor 38 rotates to the left (on the drawing) according to control signals.

When motor 38 rotates to the left, so does the gear 40, and the semicircular gear 36 rotates to the right around the hinge 32.

When the semicircular gear 36 rotates to the right around the hinge 32, so does the supporting plate 34.

When the supporting plate 34 rotates to the right, the front of the main body 20 of a camcorder fixed to the supporting plate 34 faces toward the upper side.

Meanwhile, when the object has deviated to the lower side from the shooting direction, the front of the main body 20 of a camcorder faces toward the lower side, thus causing the motor to rotate.

In this manner, when the shooting direction is corrected by way of rotation of a motor 38, the shooting direction corresponds with the object and the electrical signals P1, P2, P3, P4 outputted from photoelectric conversion means 120 become identical.

When the electrical signals P1, P2, P3, P4 outputted from photoelectric conversion means 120 become identical, direction switching means 300 stops the switching of shooting direction by way of the control signal outputted from travelling object detection means 200.

Figure 7:
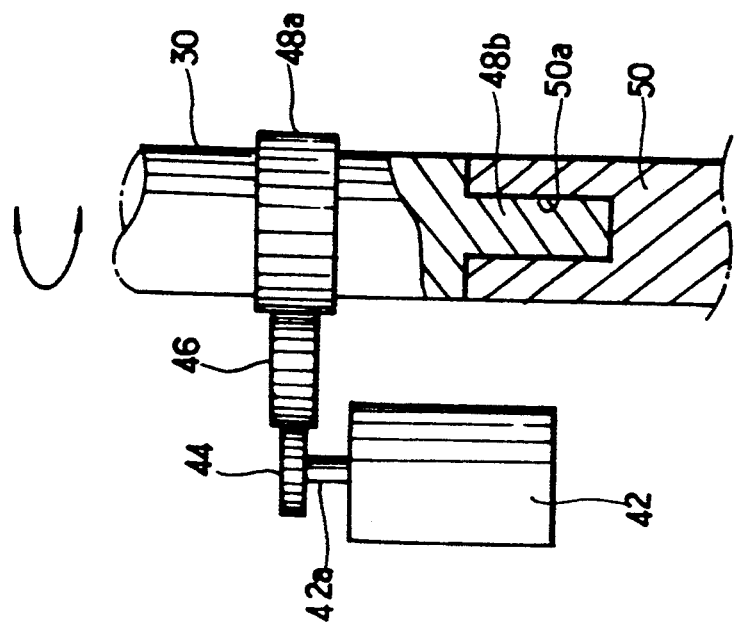
FIG. 7 is a constructional drawing of another embodiment of rotary means in accordance with the present invention.

FIG. 7 is a constructional drawing of an embodiment of left/right traveller 340 in accordance with the present invention.

According to FIG. 7, left/right traveller 340 comprises a motor 42 for rotating in the right and reverse directions according to the control signals outputted from a controller 230 of travelling object detection means 200, a gear 44 for rotating in the left and right directions being fixed to a shaft 42a of said motor 42, a speed reduction gear 46 for decelerating the rotating speed of said gear 44, and a supporting shaft 30 wherein a gear 48a engaged with said speed reduction decelerating gear 46 is formed and a lug rod 48b formed underneath is mounted for rotation in an inserted condition within circular groove 50a formed in upper center of a shaft rod 50.

At this point, the camcorder is installed on upper side of a supporting shaft 30 and the supporting shaft 30 is installed underneath.

Accordingly, when the object is judged to have deviated to the right side of shooting direction from travelling object detection means 200 as depicted in FIG. 3 or FIG. 4, thus causing to output the control signals subsequently, the motor 42 rotates to the right (when seen from the right side of the drawing) according to the control signals.

When motor 42 rotates to the right direction, so does the gear 44, and the decelerating gear 46 rotates to the left direction.

When the speed reduction decelerating gear 46 rotates to the left, the gear 48a formed on the supporting shaft 30 rotates to the right direction, and so does the supporting shaft 30.

In this location, in the supporting shaft 30, the lug rod 48b formed underneath rotates in an inserted condition within the circular groove 50a of a shaft rod 50.

In this manner, when the supporting shaft 30 rotates to the right direction, the front of camcorder (not shown) fixed to the upper side of the supporting shaft 30 faces to the right direction.

Meanwhile, when the object is judged to have deviated to the left side of shooting direction from travelling object detection means 200 depicted in FIG. 3 or FIG. 4, thus causing to output the control signals, the motor 42 rotates to the left (seen from the upper side of the drawing) according to the control signals.

When the motor 42 rotates to the left direction, so does the gear 44, and the decelerating gear 46 rotates to the right direction.

When the speed reduction decelerating gear 46 rotates to the right direction, the gear 48a formed on the supporting shaft 30 is caused to rotate to the left direction and so does the supporting shaft 30.

At this point, in the supporting shaft 30, the lug rod 48b formed underneath rotates in an inserted condition within the circular groove 50a of a shaft rod 50.

In this way, when the supporting shaft 30 rotates to the left, the front of a camcorder (not shown) fixed to the upper side of the supporting shaft 30 faces toward the left direction.

In this manner, the shooting direction is corrected by rotating the motor 42, and when the object is positioned in the center of shooting direction, the electrical signals P1, P2, P3, P4 outputted from photoelectric conversion means 120 become identical.

When the electrical signals P1, P2, P3, P4 outputted from photoelectric conversion means 120 become identical, direction switching means 300 stops the change of shooting directions of a camcorder by dint of the control signals outputted from travelling object detection means 200.

Figure 8:
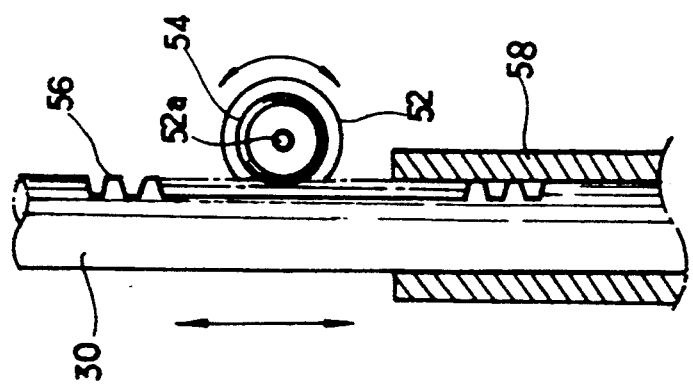
FIG. 8 is a constructional drawing of yet another embodiment of up/down moving means in accordance with the present invention.

FIG. 8 is a constructional drawing of another embodiment of up/down traveller 310 in accordance with the present invention.

According to FIG. 8, up/down traveller 310 comprises a motor 52 for rotating in the right and reverse directions by way of the control signals outputted from the controller 230 of travelling object detection means 200, a pinion gear 54 for rotating in the left and right directions being fixed to the shaft 52a of said motor 52, and a supporting shaft 30 wherein a ratchet gear 56 engaged with said pinion gear 54 is so formed that the ratchet gear can move up and down within a cylindrical shaft rod 58.

Accordingly, when the object deviates from the upper side of shooting center, travelling object detection means 200 depicted in FIG. 3 or FIG. 4 outputs the control signals and rotates the motor 52 to the right direction (on the drawing).

When the motor 52 rotates to the right direction, so does the pinion gear 54.

When pinion gear 54 rotates to the right direction, the supporting shaft 30 formed with ratchet gear 56 is guided in the shaft rod 58 and moves to the upper side.

When the supporting shaft 30 moves up to the upper side, the camcorder installed on the upper side of said supporting shaft 30 moves up to the upper side.

Therefore, the object becomes positioned in the shooting center.

When the object becomes positioned in the shooting center, the electrical signals P1, P2, P3, P4 outputted from photoelectric conversion means 120 become identical, and by dint of control signals outputted from travelling object detection means 200, direction switching means 300 stops changing the shooting directions of a camcorder.

Contrary to the above, when the object deviates toward the lower side from the shooting center, the shooting center is adjusted by way of operation in the reverse way as explained in the above.

Figure 9:
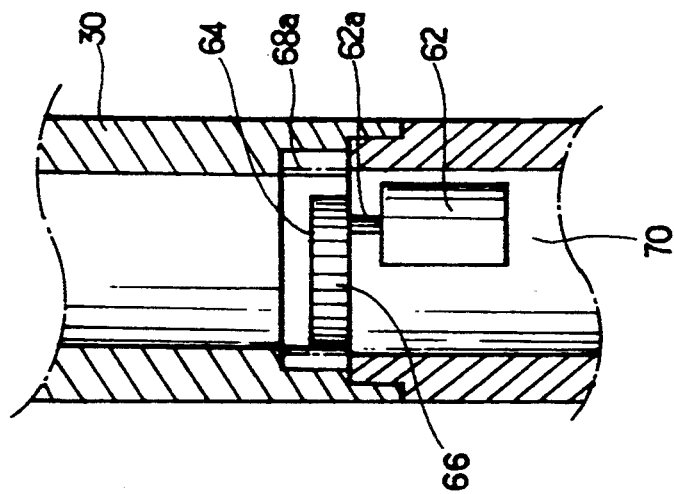
FIG. 9 is a constructional drawing of still another embodiment of rotary means in accordance with the present means.

FIG. 9 is a constructional drawing of another embodiment of left/right traveller 340 in accordance with the present invention.

According to FIG. 9, left/right traveller comprises a motor 62 for rotating in the right and reverse directions by way of the control signals outputted from the controller 230 of travelling object detection means 200, a gear 64 for rotating in the left and right directions being fixed to the shaft 62a of said motor 62, a decelerating gear 66 for decelerating rotary speed of said gear 64, and a supporting shaft 30 wherein a gear 68a toothed into said decelerating gear 66 is formed on the inner lower end, and is mounted on the shaft rod 70 of lower side for rotation.

Accordingly, when the object is judged to have deviated toward the right side of shooting direction from travelling object detection means 200 as illustrated in FIG. 3 or FIG. 4, thereby causing to output control signals, the motor 62 rotates to the left direction (seen from the upper side of the drawing) according to control signals.

When the motor 62 rotates to the left, so does the gear 64, and decelerating gear 66 rotates to the right direction.

When decelerating gear 66 rotates to the right direction, the supporting shaft 30 having a gear 68a engaged with decelerating gear 66 being formed inside rotates to the right direction.

In this manner, when the supporting shaft 30 rotates to the right direction, the front of a camcorder (not shown) fixed to the upper side of the supporting shaft 30 faces toward the right direction.

Meanwhile, when the object deviates toward the left side of shooting direction, travelling object detection means 200 as depicted in FIG. 3 or FIG. 4 outputs control signals, thus causing the motor 62 to rotate to the right direction (seen from the upper side of the drawing).

When the motor rotates to the right direction, so does the gear 64, and decelerating gear 62 rotates to the left direction.

When decelerating gear 66 rotates to the left direction, so does the supporting shaft 30.

When supporting shaft 30 rotates to the left direction, the front (not shown) of a camcorder fixed to the upper side of the supporting shaft 30 faces toward the left direction.

In this manner, when the shooting direction is corrected by rotating the motor and the object is positioned on the center of shooting direction, the electrical signals P1, P2, P3, P4 outputted from photoelectric conversion means 120 become identical.

When the electrical signals P1, P2, P3, P4 outputted from photoelectric conversion means 120 become identical, direction switching means 300 stops changing the shooting direction of a camcorder by way of control signals outputted from travelling object detection means 200.

Figure 10:
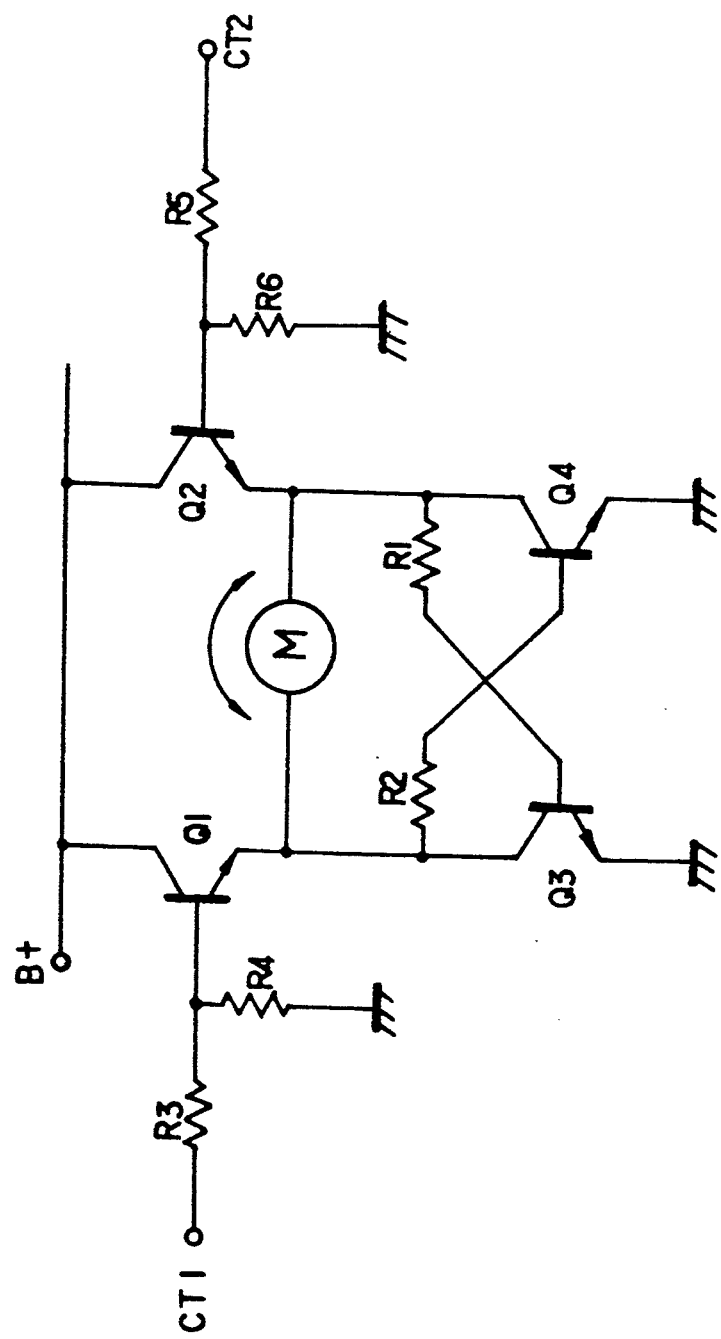
FIG. 10 is a circuit drawing of one embodiment of a motor driving circuit as shown in FIG. 5, FIG. 6, FIG. 7 and FIG. 8.

FIG. 10 is an embodiment of a motor driving circuit for rotating the motor M 38, 42, 52, 62 in the right and reverse directions as depicted in above FIG. 6 through FIG. 9 in accordance with control signals CT1, CT2 outputted from the controller 230 of travelling object detection means 200.

According to FIG. 10, in the motor driving circuit, when control signal CT1 or CT2 becomes of high level, transistors Q1, Q4 or Q2, Q3 start operating, causing motor M to rotate in the right or reverse direction.

Subsequently, up/down traveller and left/right traveller start operating for the switching of shooting direction.

In this location, unexplained codes of B+ is a motor driving voltage and R1, R2, R3, R4, R5, R6 are resistors.

Figure 11A:
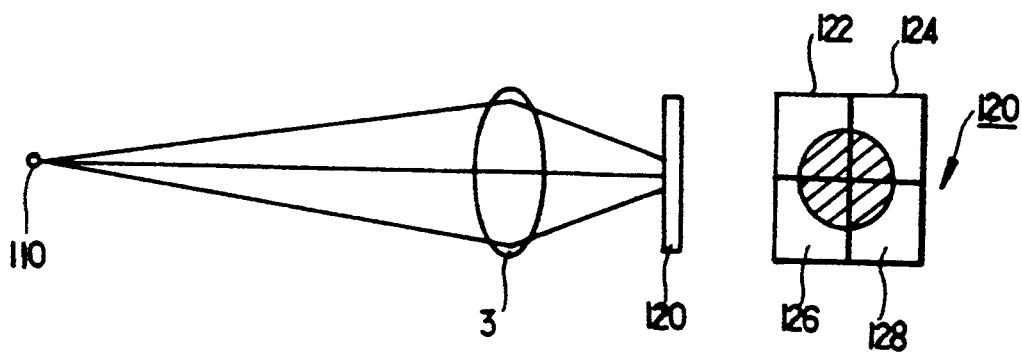
FIG. 11A and FIG. 11B are drawings for explaining the operational principle of an object tracking apparatus in accordance with the present invention.
Figure 11B:
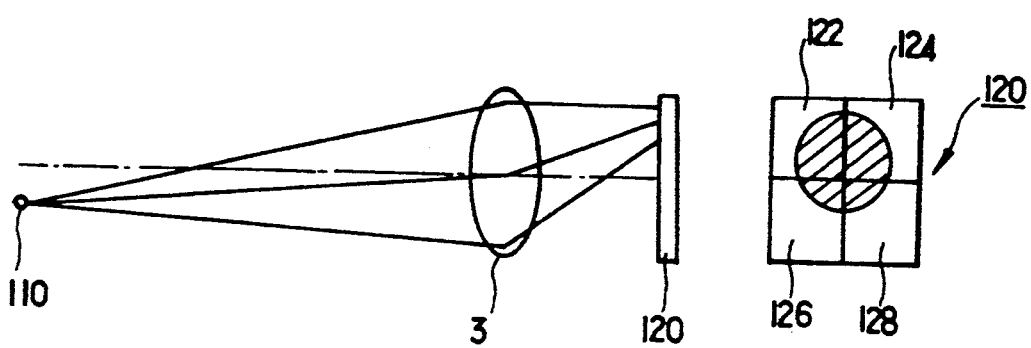

FIG. 11A and FIG. 11B are the drawing for explaining the operational principles of an object tracking apparatus in accordance with the present invention.

FIG. 11A is a drawing wherein the shooting direction and the position of object are normal, which means the position of an object is in the shooting center.

At this point, the light emitted from light emitting means 110 for object detection is incident upon the center of photoelectric conversion means 120 constructed with photo sensors 122, 124, 126, 128 through light receiving lens 3.

When the light generated from light emitting means 110 for object detection is incident upon the center of photoelectric conversion means 120, the magnitudes of electrical signals P1, P2, P3, P4 photoelectrically converted from photoelectric conversion means 120 become identical.

In other words, $$P1=P2=P3=P4.$$

Accordingly, travelling object detection means 200 as illustrated in FIG. 3 and FIG. 4 comes to judge that the object is positioned in the shooting center when the electrical signals are identical.

FIG. 11B is a drawing showing that the shooting direction of a camcorder and the position of an object are abnormal, which means that the object deviates to the lower side from the shooting center.

At this point, the light emitted from light emitting means 110 for object detection is incident upon the upper side of photoelectric conversion means 120 comprising photo sensors 122, 124, 126, 128 through light receiving lens 3.

When the light emitted from light emitting means 110 for object detection is incident upon the upper side of photoelectric conversion means 120, the electrical signals P1, P2, P3, P4 photoelectrically converted at photoelectric conversion means 120 become P1=P2, P2=P4, P1>P3 and P2>P4.

Likewise, when the object deviates toward the upper side from the shooting center, the electrical signals become P1=P2, P3=P4, P1<P3 and P2<P4.

When the object deviates toward the right side from the shooting center, the electrical signals become P1<P2, P3<P4, P1=P3 and P2-P4.

When the object deviates toward the left side from the shooting center, the electrical signals become P1<P2, P3<P4, P1=P3 and P2=P4.

According to this kind of judgement, travelling object detection means 200 recognizes that the object has deviated from the shooting center, and the control signal is outputted toward the deviated direction in order to switch the direction of a camcorder.

However, the condition is that the photo sensors 122, 124, 126, 128 for converting the light incident from the object to electrical signals are respectively positioned on the upper left, upper right, lower left and lower right sides, and the magnitudes of electrical signals outputted from each photo sensor 122, 124, 126, 128 are P1, P2, P3, and P4.

Figure 12:
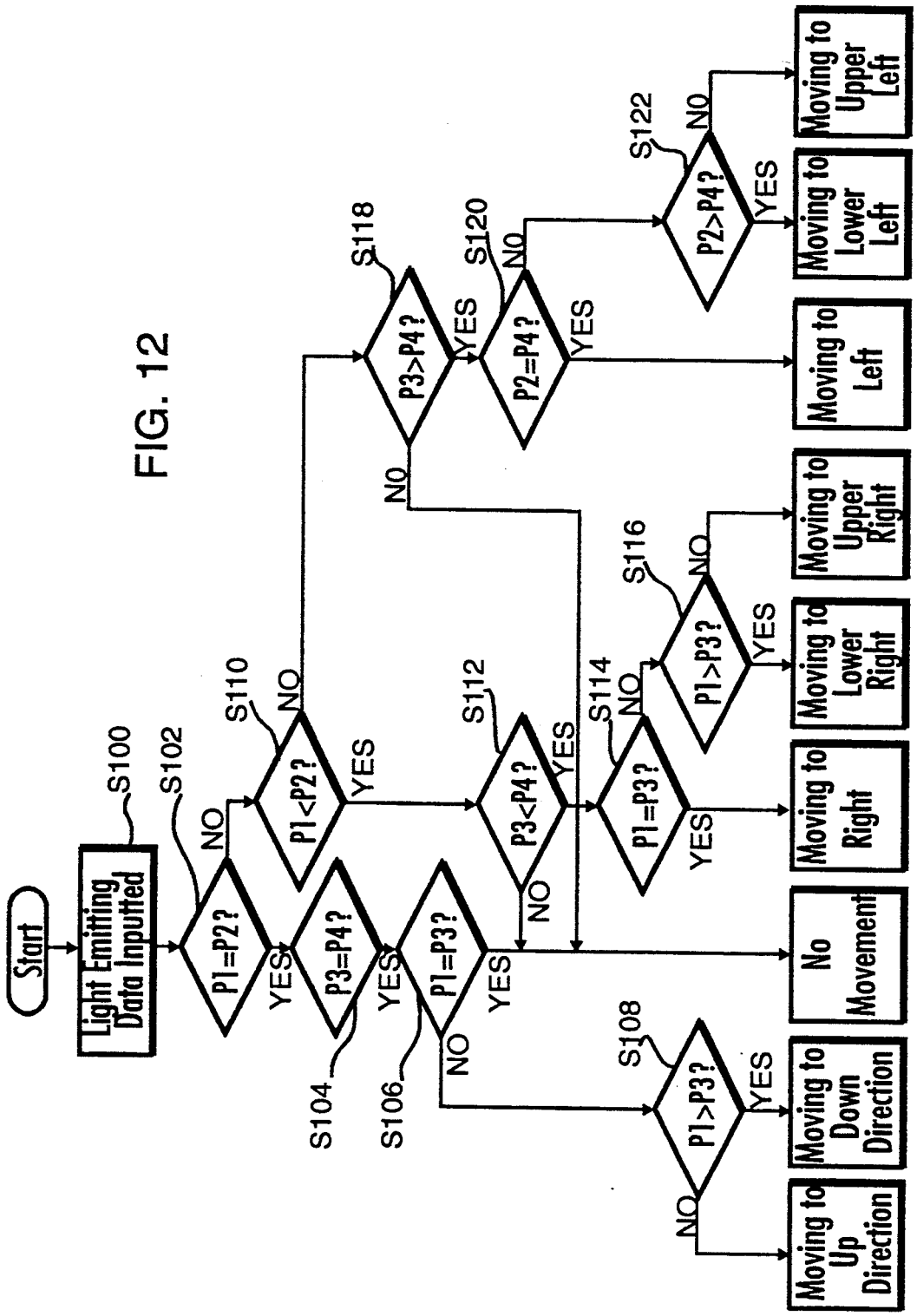
FIG. 12 is a flow chart for showing an object tracking method of a camcorder in accordance with the present invention.

FIG. 12 is a flow chart of an object tracking method for converting the shooting direction of a camcorder along the travelling direction of an object and for detecting the travelling direction of an object according to the electrical signals P1, P2, P3, P4 inputted from photoelectric conversion means 120.

According to said FIG. 12, the object tracking method comprises a first step for comparing mutually the magnitudes of electrical signals outputted respectively from at least more than 4 photo sensors which convert the light incident from the objects to electrical signals, and a second step for converting the direction of a camcorder according to the comparison results of said first step.

The first step out of said object tracking method comprises:

left/right comparison steps, steps 102, 104 for comparing whether the magnitudes of electrical signals (P1, P3) (P2, P4) are identical, which are outputted from the photo sensors 124, 128 positioned on the right and the photo sensors 122, 126 positioned on the left;

up/down comparison steps, steps 106, 108 for comparing whether the magnitudes of electrical signals (P1, P3) (P2, P4) are identical, which are outputted from photo sensors 122, 126 or 124, 128 respectively positioned on the upper and lower side when the magnitudes of left and right are discriminated to be identical by the comparison results of said left/right comparison steps;

left/right magnitude comparison steps, steps 110, 112, 118 for comparing the magnitudes of electrical signals (P1, P2) (P3, P4) outputted from photo sensors 122, 124 or 126, 128 positioned on the left and right respectively when the comparison results of said left/right comparison steps show that the magnitudes of left and right are not identical; and up/down magnitude comparison steps, steps 114, 116 and steps 120, 122 for comparing the magnitudes of electrical signals (P1, P3) (P2, P4) outputted from photo sensors 122, 126 or 124, 128 positioned on the upper and lower side after the magnitudes of left and right sides are judged at said left/right magnitude comparison steps.

Further explanations of the above are given as below.

When the electrical signals P1, P2, P3, P4 photo electrically converted from the photo sensors 122, 124, 126, 128 of photoelectric conversion means 120 as defined in FIG. 3 or FIG. 4 are inputted into travelling object detection means 200, said electrical signals are amplified at the amplifier 210 at step 100.

The comparative circuit 220, when amplified signals P1, P2, P3, P4 are inputted, compares the signals one another, and outputs the comparison results to the controller 230.

The controller 230, according to the comparative results of said comparative circuit 220, discriminates whether the magnitudes of signals, P1 and P2, outputted from a photo sensor 122 positioned on upper left and a photo sensor 124 positioned on upper right are identical, step 102.

When discrimination result of said step 102 shows that P1 equals P2, the controller 230 discriminates at step 104, whether the magnitudes P3, P4 outputted from photo sensors 126, 128 positioned respectively on the lower left and lower right are identical.

When the discrimination result at step 104 shows that P3 equals P4, it is judged that the shooting direction is not deviated toward the left or right.

when the shooting direction is not deviated toward left or right, the controller 230 discriminates whether the magnitudes of signals P1, P3 outputted from photo sensors 122, 126 respectively positioned on the upper right and on the lower left are identical at step 106.

At said step 106, if discrimination is made on whether the signals P2, P4 outputted from photo sensors 124, 128 respectively positioned on the upper right and lower right are identical, the result will be the same.

When the discrimination result of said step 106 shows that P1 equals P3, P1 equals P2, P3 equals P4 and P1 equals P3, and as shown in FIG. 11A, it is judged that the shooting direction of a camcorder has not deviated from the object.

In this location, the controller does not output control signals toward direction switching means 300, however, if discrimination result of step 106 shows that P1 does not equal P3, the controller discriminates whether P1 is larger than P3, step 108.

If P>P3 at said step 108, which implies that the object is positioned on the lower area from the shooting center, the controller 230 outputs control signals to direction switching means 300 and changes the shooting direction of a camcorder toward the lower side.

If discrimination result at step 108 reveals that P1 is not smaller than P3, which implies that the result of step 106 is P1=P3, then subsequently P1<P3.

At this moment, as the object is positioned above the shooting center, the controller 230 outputs control signal accordingly toward direction switching means 300 for changing the shooting direction of a camcorder toward the upper side.

Meanwhile, if P3=P4 at step 104, the result is P1=P2 and P3=P4, however as this kind of result seldom exist, the controller 230 judges the said result as an error and does not output control signal to direction switching means 300.

If P1=P2 at step 102, the controller discriminates if P1<P2 at step 110.

If P1<P2 at said step 110, the controller discriminates if P3<P4 at step 112.

If P3 is not smaller than P4 at step 112, which seldom exists though, then the controller discriminates said result as an error and does not output control signal to direction switching means 300.

If P3<P4 at step 112, it is judged that the object is positioned on the right side of shooting center.

When discrimination result of step 112 reveals that the object is positioned on the right side of shooting center, the controller discriminates whether P1=P3 at step 114.

If P1=P3 at said step 114, the controller discriminates that the object has not deviated to the upper or lower sides from the shooting center.

Accordingly, the controller 230 outputs control signal to direction switching means 300 and changes the shooting direction to the right side.

If P1=P3 at step 114, the controller discriminates whether P>P3 at step 116.

If P1>P3 at said step 116, the controller judges that the object is positioned on the upper right side of shooting center, and then outputs control signal to direction switching means 300, finally changes the shooting direction of a camcorder to the lower right side.

If discrimination result reveals that P1 is not larger than P3, the controller 230 judges that the object is positioned on the upper right side of shooting center, outputs control signal to direction switching means 300 and changes the shooting direction of a camcorder to the upper right side.

In the meantime, if discrimination result reveals that P1 is not smaller than P2, then the controller 230 discriminates whether P3>P4, step 118.

If P3>P4 at said step 118, the controller discriminates that the object is positioned on the left side of shooting center, and then discriminates whether P2=P4, step 120. However as the condition that P3 is not smaller than P4 seldom exists, the controller 230 judges this situation as an error, and does not output control signal to direction switching means 300.

If P1>P2 at steps 102, 110, which implies that the object has deviated to the left from the shooting center, then the result becomes P3>P4.

Therefore, the condition of P3>P4 does not exist and this result can be discriminated as an error.

If P2=P4 at said step 120, the controller discriminates that the object has deviated to the left side from the shooting center, and changes the shooting direction of a camcorder to the left side.

In other words, if P2=P4, it implies that the object has not deviated to the upper or lower side from shooting center, and as it has already been discriminated that the object had deviated to the left side from the shooting center at steps 102, 110 118, the controller 230 changes the shooting direction to the left side.

If P2=P4 at step 120, the controller discriminates whether P2>P4, step 122.

If P2>P4 at said step 122, the controller 230 discriminates that the object has deviated to the lower left direction of a camcorder, outputs control signal to direction switching means 300 and changes the shooting direction of a camcorder to the lower left.

If not P2>P4 at step 122, the controller 230 discriminates that the object has deviated to the upper left of a camcorder, outputs control signal to direction switching means 300 and changes the shooting direction of a camcorder to the upper left direction.

Accordingly, the object tracking method of a camcorder in accordance with the present invention detects the deviated direction of an object according to the light incident upon photoelectric conversion means in order to change the shooting direction of a camcorder.

From the foregoing, the object tracking method of a camcorder and the method thereof can obtain the effect of automatically tracking the object by way of simple construction.

Furthermore, the camcorder can be miniaturized and lightened by providing the object tracking apparatus utilizing auto-focusing apparatus.

The foregoing description of the preferred embodiment has presented for the purpose of illustration and description. If is not intended to limit the scope of this invention. Many modifications and variations are possible in light of above teaching.

Specifically, though said explanations have depicted photoelectric conversion means having only 4 photo sensors, it is natural that we can obtain the object of the present invention using photoelectric conversion means having more than 4 photo sensors.

Besides, in the foregoing object tracking method of the present invention, though comparison of deviation in the left and right sides has been firstly performed and then comparison of deviation in the up and down directions has been performed later, it should be apparent that the present invention provides same effective results even with the simple changes of the procedures.

I claim:

1. An object tracking apparatus of a camcorder having a lens capable of focusing on an object positioned at various distances from said lens, comprising:
   light emitting means for generating light of a first frequency, attachable to said object;
   focus purpose light emitting means for generating light of a second frequency, said light of a second frequency capable of reflection off said object;
   photoelectric conversion means for converting to electrical signals said light of a second frequency reflected off said object and the light of a first frequency incident and generated from said light emitting means;
   travelling object detection means for discriminating the moving status of the object by utilizing the signals photoelectrically converted from said photoelectric conversion means; and
   direction switching means for changing the shooting direction of the camcorder in accordance with said moving status of the object detected from said travelling object detection means.

2. An object tracking apparatus of a camcorder as defined in claim 1, wherein said photoelectric conversion means comprises at least 4 photo sensors.

3. An object tracking apparatus of a camcorder as defined in claim 1, wherein said travelling object detection means includes:
   an amplifier for amplifying electrical signals photoelectrically converted from said photoelectric conversion means;
   comparative means for comparing electrical signals amplified from the amplifier to obtain a comparative result; and
   a controller for outputting a control signal which changes the shooting direction in accordance with the comparative result of said comparative means.

4. An object tracking apparatus of a camcorder as defined in claim 1, wherein said direction switching means includes:
   an up/down traveller for moving the shooting direction of the camcorder up and down in accordance with a control signal outputted from said travelling object detection means; and
   a left/fight traveller for moving the shooting direction of the camcorder in the left and right directions in accordance with said control signal outputted from said travelling object detection means.

5. An object tracking apparatus of a camcorder as defined in claim 4, wherein said up/down traveller includes:
   a motor which rotates in the right and reverse direction in accordance with said control signal outputted from said travelling object detection means;
   a gear which rotates in the left and right direction in accordance with said control signal outputted from said travelling object detection means being secured to a shaft of said motor;
   a semicircular gear which rotates around a hinge installed on the upper side of a supporting shaft engaged with said gear; and
   a supporting plate secured on the lower area of the main body of the camcorder, said supporting plate integrally formed with said semicircular gear.

6. An object tracking apparatus of a camcorder as defined in claim 4, wherein said up/down traveller includes:
   a motor which rotates in the right and reverse directions in accordance with control signal outputted from said travelling object detection means;
   a shaft rod of a circular shape fixably attached to said camcorder;
   a pinion gear which rotates in the left and right directions being secured to the shaft of said motor; and
   a supporting shaft wherein a ratchet gear engaged with said pinion gear is formed for movement in the up and down direction within the shaft rod of circular shape.

7. An object tracking apparatus of a camcorder as defined in claim 4, wherein said left/right traveller includes:
   a motor which rotates in the right and reverse directions by way of control signal outputted from said travelling object detection means;
   a gear which rotates in the left and right direction being secured to the shaft of said motor;
   a speed reduction gear for reducing rotating speed of said gear; and
   a shaft rod fixably attached to said camcorder;
   a supporting shaft wherein a gear engaged with said speed reduction gear is formed on the lower end of the inside of said supporting shaft for rotation on the shaft rod on the lower side.

8. An object tracking apparatus of a camcorder as defined in claim 4, wherein said left/right traveller includes:
   a motor which rotates in the right and reverse directions in accordance with the control signal outputted from said travelling object detection means;
   a gear which rotates in the left and right directions being secured to a shaft of said motor;
   a speed reduction gear for reducing the rotating speed of said gear; and
   a supporting shaft for rotating in the left and right directions the camcorder installed on the upper side of said supporting shaft, said camcorder interlocked with said speed reduction gear.

9. An object tracking apparatus of a camcorder as defined in claim 8, wherein said supporting shaft is formed with a gear engaged with said speed reduction gear, with the camcorder mounted on the upper side of said supporting shaft and with a protrusion formed on the lower side of said supporting shaft being inserted in a circular groove formed in the upper center of said supporting shaft for rotation.

10. An object tracking method of a camcorder by changing shooting direction of said camcorder, comprising:
    mutually comparing magnitudes of electrical signals P1, P2, P3 and P4 outputted respectively from at least 4 photoelectric conversion elements comprised of photo sensors positioned on upper left, upper right, lower left and lower right which convert light incident from an object to said electrical signals;
    changing the shooting direction upward when P1=P2, P3=P4, and P1<P3;
    changing the shooting direction downward when P1=P2, P3=P4, and P1>P3;
    changing the shooting direction to the right when P1<P2, P3<P4, and P1=P3;
    changing the shooting direction to lower right when P1<P2, P3<P4, and P1>P3;
    changing the shooting direction to upper right when P1<P2, P3<4, and P1<P3;

changing the shooting direction to the left when P1>P2, P3>P4, and P2=P4;

changing the shooting direction to lower left when P1>P2, P3>P4, and P2>P4; and changing the shooting direction to upper left when P1>P2, P3>P4, and P2<P4.

11. An object tracking apparatus, comprising:

a camcorder having a single housing and a lens focusable on moveable objects, said camcorder exhibiting a shooting direction on an axis passing perpendicularly through said lens;

light emitting means attachable to a selected one of the objects, for generating light of a first frequency;

focus purpose light emitting means contained in said single housing of said camcorder, for illuminating the selected one of the objects with light of a second frequency;

photoelectric conversion means contained in said single housing of said camcorder, for converting said light of a first frequency and said light of a second frequency into electrical signals;

travelling object detection means contained in said single housing of said camcorder, for receiving said electrical signals generated by said photoelectric conversion means and for deriving from said electrical signals an indication representative of movement by the selected one of the objects; and direction switching means attached to said camcorder, for changing said shooting direction of said camcorder in accordance with said indication.

12. An object tracking apparatus of a camcorder as defined in claim 11, further comprised of said photoelectric conversion means comprising a plurality of photosensors.

13. An object tracking apparatus of a camcorder as defined in claim 11, wherein said travelling object detection means comprises:

an amplifier for amplifying said electrical signals converted by said photoelectric conversion means;

comparative means for comparing said electrical signals amplified from said amplifier to obtain a comparative result; and a controller for deriving said indication according to the comparative result obtained from said comparative means.

14. An object tracking apparatus of a camcorder as defined in claim 13, wherein said direction switching means comprises:

an up/down traveller for changing the shooting direction of the camcorder up and down according to said indication derived from said travelling object detection means; and a left/right traveller for changing the shooting direction of the camcorder left and right according to said indication derived by said travelling object detection means.

15. An object tracking apparatus of a camcorder as defined in claim 14, wherein said up/down traveller comprises:

a motor having a shaft which rotates in a first and a second direction in accordance with said indication derived from said travelling object detection means;

a gear secured to said shaft of said motor, which rotates in said first and said second directions in accordance with said shaft;

a supporting shaft having an upper side and having a hinge installed on said upper side of said supporting shaft;

a semicircular gear mounted onto said hinge, which rotates around said hinge, said semicircular gear being engaged with said gear; and a supporting plate fixed to said semicircular gear and secured to said single housing of the camcorder such that said supporting plate changes said shooting direction of said camcorder in the up and the down directions according to said indication derived by said travelling object detection means.

16. An object tracking apparatus of a camcorder as defined in claim 14, wherein said up/down traveller comprises:

a motor having a shaft which rotates in a first and a second direction in accordance with said indication derived from said travelling object detection means;

a shaft rod having a hollow cavity;

a pinion gear secured to said shaft of said motor, which rotates in said first and said second directions;

a supporting shaft having an upper portion and a lower portion, said camcorder attached to said upper portion of said supporting shaft and said lower portion of said supporting shaft positioned in said hollow cavity of said shaft rod; and a ratchet gear linearly extending along said supporting shaft, said ratchet gear engaged with said pinion gear such that said supporting shaft slides in the up and down direction within the hollow cavity of said shaft rod according to said indication derived from said travelling object detection means.

17. An object tracking apparatus of a camcorder as defined in claim 14, wherein said left/right traveller includes:

a motor having a shaft which rotates in a first and a second direction according to said indication derived by said travelling object detection means;

a gear secured to the shaft of said motor, which rotates in said first and said second directions;

a speed reduction gear engaged with said;

an upper supporting shaft having said camcorder mounted on an upper portion of said upper supporting shaft, and having a cylindrical recess having inner walls formed in a lower portion of said upper supporting shaft; and a lower supporting shaft having a cylindrical protrusion formed on an upper portion of said lower supporting shaft, and having said motor mounted within said lower supporting shaft such that said protrusion of said lower supporting shaft mates with said cylindrical recess of said upper supporting shaft and said speed reduction gear meshes with said inner walls of said cylindrical recess such that said upper supporting shaft changes said shooting direction in the left and right directions according to said indication derived from said travelling object detection means.

18. An object tracking apparatus of a camcorder as defined in claim 14, wherein said left/right traveller comprises:

a motor having a shaft which rotates in a first and a second direction according to said indication derived by said travelling object detection means;

a gear secured to said shaft of said motor which rotates in the left and right directions;

a speed reduction gear engaged with said gear, for reducing the rotating speed of said gear; and a supporting shaft having an upper side and having a collar gear fixed to said upper side of said supporting shaft and circumferentially surrounding said upper side of said supporting shaft, said collar gear interlocked with said speed reduction gear for rotating the camcorder installed on the upper side of said supporting shaft in the left and right directions according to said indication derived from said travelling object detection means.

19. An object tracking apparatus of a camcorder as defined in claim 18, wherein said supporting shaft comprises:

an upper supporting shaft having said camcorder mounted on an upper portion of said upper supporting shaft, and having a cylindrical protrusion formed on a lower portion of said upper supporting shaft; and a lower supporting shaft having a cylindrical recess having inner walls formed in an upper portion of said lower supporting shaft such that said protrusion of said upper supporting shaft mates with said cylindrical recess of said lower supporting shaft.

* * * * *